Figure 1:
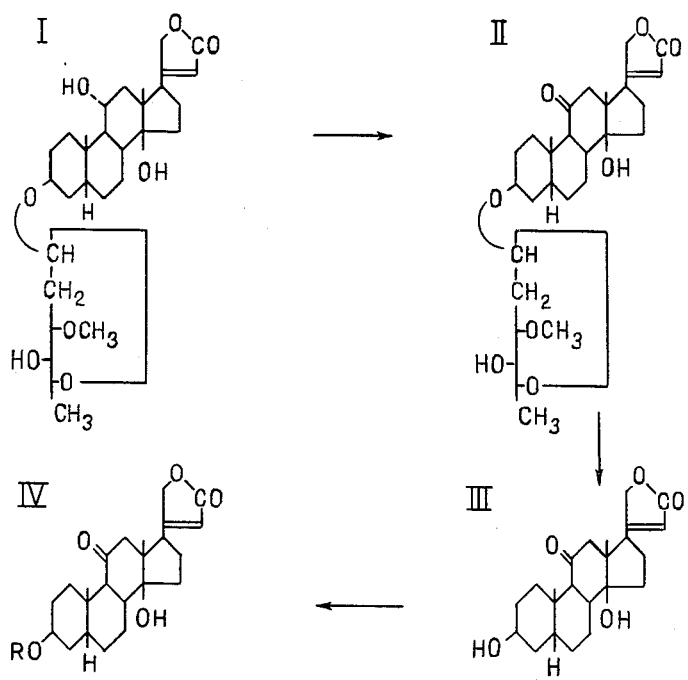

June 26, 1956

T. REICHSTEIN 2,752,372

3,14,21-TRIHYDROXY PREGNANEDIONES-(11,20) AND PROCESS

Filed Sept. 23, 1953

2 Sheets-Sheet 1

INVENTOR.
TADEUS REICHSTEIN
BY
Klein Hart
ATTORNEYS

June 26, 1956     T. REICHSTEIN     2,752,372
3,14,21-TRIHYDROXY PREGNANEDIONES-(11,20) AND PROCESS
Filed Sept. 23, 1953     2 Sheets-Sheet 2

INVENTOR.
TADEUS REICHSTEIN
BY
ATTORNEYS

United States Patent Office

2,752,372
Patented June 26, 1956

2,752,372

3,14,21-TRIHYDROXY PREGNANEDIONES-(11,20) AND PROCESS

Tadeus Reichstein, Basel, Switzerland, assignor to Organon, Inc., Orange, N. J., a corporation of New Jersey Application September 23, 1953, Serial No. 381,820

Claims priority, application Netherlands September 13, 1947

10 Claims. (Cl. 260—397.45)

This invention relates to new pregnane compounds and more particularly to new 11-keto pregnane compounds, and to a process of making same. The present application is a continuation-in-part application of my copending applications, Serial No. 361,310, entitled Process for the Preparation of Derivatives of Sarmentogenin, filed June 12, 1953, and Serial No. 254,880, entitled A Process of Preparing Compounds Having Adreno-Cortical Hormone Activity, filed November 5, 1951.

It is one object of this invention to provide a new intermediate starting material for the production of 11-keto pregnane compounds from sarmentogenin, i. e., a steroid compound produced from vegetable material. Said new intermediate starting material is called 11-dehydrosarmentogenin and is readily convertible either as such or in the form of its esters into 11-keto pregnane compounds, as hereinafter set forth.

Another object of this invention is to provide new and valuable 11-keto pregnane compounds which have in 14-position a hydroxyl group.

A further object of this invention is to provide new and valuable 11-keto pregnane compounds which have a double bond between the carbon atoms 14 and 15.

Still another object of this invention is to provide a simple and effective process of converting the glycosides of sarmentogenin, such as sarmentocymarin, sarnovid, and other so-called sarmentosides, into 11-dehydrosarmentogenin and its esters and other derivatives, such as glycosides.

A further object of this invention is to provide a simple and effective process of converting said 11-dehydrosarmentogenin, its esters and other derivatives into 11-pregnane compounds.

Other objects of this invention and advantageous features thereof will become apparent as the description proceeds.

In order to convert sarmentogenin into 11-dehydrosarmentogenin, its 11-hydroxyl group is oxidized under mild conditions of oxidation to the corresponding keto group. The reaction conditions must be so mild that the lactone ring in sarmentogenin is not attacked and split open by the oxidizing agent. The sarmentogenin glycosides as they are obtained from vegetable material, are preferably used as starting material, rendering unnecessary the conversion of said glycosides into sarmentogenin and thus, saving the costs of conversion and reducing the losses incurred in such conversion. The conditions of oxidation of course, must consequently also be so mild that the glycoside residue in 3-position is not split off during oxidation of the 11-hydroxyl group to the keto group. The glycoside residue, thus serves to protect the 3-hydroxyl group against the action of the oxidizing agent. Subsequently to oxidation of the 11-hydroxyl group, the glycoside residue, if desired, may be split off and the free hydroxyl group in 3-position may be esterified.

The resulting final products, 11-dehydrosarmentogenin and its esters, are important intermediates in the synthesis of adrenocortical hormones, examples whereof are corticosterone 11-dehydrocorticosterone, cortisone. They are more stable than the corresponding 11-hydroxy compounds or compounds having a protected hydroxyl group in 11-position. Their use in the synthesis of adrenocortical hormones has the advantage that a larger yield of said hormones is achieved on further reaction of said 11-dehydrosarmentogenin compounds.

Conversion of said 11-dehydrosarmentogenin and its esters into adrenocortical hormones is effected by first subjecting said starting material to the following reaction steps:

1. Opening of the double bond in ring E by oxidation to form a glyoxylic acid derivative.
2. Saponifying said glyoxylic acid derivative to produce a ketol group at carbon atom 17.
3. Eliminating the tertiary hydroxyl group at carbon atom 14 by splitting off water and formation of a double bond in ring D between carbon atoms 14 and 15.
4. Either before or after splitting off water from the carbon atoms 14 and 15, the hydroxyl group in 21-position or all the hydroxyl groups present at carbon atoms 3 and 21 are esterified or etherified.
5. The double bond between the carbon atoms 14 and 15 is then hydrogenated to produce in ring D saturated compounds.

The $\Delta^{14,15}$-unsaturated as well as the saturated compounds obtained thereby represent valuable intermediate products which may be converted into adrenocortical hormones in the following manner:

On oxidation they yield the corresponding 3,11,20-triketo compounds which upon introduction of a double bond between carbon atoms 4 and 5 by halogenation and splitting off hydrogen halide, yield corticosterones and its 21-esters.

Other methods of converting the intermediate products obtained according to the present invention from dehydrosarmentogenin and its esters, into adrenocortical hormones may also be employed such as they are disclosed for instance, in my copending patent applications Serial No. 254,880, entitled A Process of Preparing Compounds Having Adreno-Cortical Hormone Activity and filed November 5, 1951, and Serial No. 362,608, entitled A Process for the Preparation of Compounds of the Pregnane Series, filed June 18, 1953.

As starting materials for the process according to this invention, there are used the glycosides of sarmentogenin, such as sarmentocymarin, sarnovid, and other so-called sarmentosides.

Oxidation of these glycosides of sarmentogenin is effected under mild conditions, for instance, at a low temperature and/or by exposing the starting material to the action of the oxidizing agent for a short period of time. Commonly used oxidizing agents are employed in this reaction, for instance, permanganate solution, aluminum alcoholate in the presence of a ketone or an aldehyde, and preferably, chromium trioxide in glacial acetic acid. It is relatively easy to find out the proper oxidation conditions for each oxidizing agent by carrying out preliminary oxidation tests with varying concentrations of the oxidizing agent and the compound to be oxidized, at various temperatures and for varying reaction times. In general low oxidation temperature and not too long a time of reaction will give good results. The following Examples 1 and 2 show the influence of varying amounts of oxidizing agent and of varying reaction times upon the yield.

The sugar residue is split off by means of hydrolyzing agents which are capable of hydrolyzing glycosidic bonds. Such agents are for instance, mineral acids, compounds of alkaline reaction, such as solutions of alkali hydroxides, alkali carbonates, alkali bicarbonates, and as a preferred hydrolyzing agent, mineral acids in an alcoholic medium whereby hydrolysis is preferably effected at boiling temperature.

The resulting 11-dehydrosarmentogenin can be converted into its esters by means of acylating agents, for instance, such as are commonly used in steroid chemistry, like acid anhydrides, acid halogenides, and the acids themselves. Such esters are for instance, the esters of 11-dehydrosarmentogenin with lower fatty acids, such as formic, acetic, propionic, butyric acids, higher fatty acids such as caprylic, caproic, capric acids, aromatic acids such as benzoic acid, trifluoro acetic acid, cyclopentano propionic acid, cyclohexano acetic acid and 3-carbomethoxy-, 3-carbethoxy-, and 3-carbobenzoxy-11-dehydrosarmentogenin. Other derivatives wherein the hydroxyl group is converted into a group which on hydrolysis, yields the hydroxyl group, such as ethers might also be used.

For splitting open ring E of said 11-dehydrosarmentogenin and its esters, ozone is used as oxidising agent. The initially produced ozonide is converted into the corresponding glyoxylic acid ester by a reductive treatment, especially by means of zinc dust and glacial acetic acid. Simple hydrolysis is also useful in this reaction. Ozonisation of 11-dehydrosarmentogenin or its esters is preferably carried out at a temperature between —80° C. and —20° C. whereby a suitable solvent, inert to ozone, is employed. The preferred solvent for said ozonisation step is ethyl acetate.

Saponification of the resulting glyoxylic acid ester is carried out by means of an agent which is capable of hydrolysing esters to the corresponding alcohols and acids. Preferably an alkaline saponifying agent is used, such as potassium bicarbonate and potassium hydroxide in aqueous methanol or ethanol. The preferred mode of operation is to allow the saponification mixture to stand at room temperature until saponification is complete. When using potassium bicarbonate in alcoholic solution, the acyloxy group in 3-position remains substantially unsaponified and only the glyoxylic acid ester bond is split up. When using stronger hydrolyzing agents, such as an aqueous potassium hydroxide solution, not only the ketol residue in 17-position is formed, but at the same time the acyloxy group in 3-position is saponified. The same result may be achieved for instance, by boiling the glyoxylic acid ester in alcoholic solution with hydrochloric acid.

Before removing from the resulting 3,14,21-trihydroxy pregnandione-(11,20) or its 3-ester the hydroxyl group in 14-position, the hydroxyl groups in 3- and 21-position are protected against the reaction agents by conversion into groups, which on hydrolysis yield the hydroxyl group, such as ester, ether and the like groups. Preferably they are acylated by means of acylating agents as they are commonly used in steroid chemistry. Such acylating agents are for instance, acetic acid anhydride, acetyl chloride, propionic acid anhydride, benzoyl chloride, trimethyl acetylchloride and other acylating agents as mentioned above. An advantageous method of acylating consists in the reaction of the corresponding carboxylic acid chlorides or anhydrides with the hydroxyl compounds in the presence of alkaline substances which are capable of combining with, and thus of eliminating hydrogen halide formed, such as alkali hydroxide and preferably organic tertiary bases, such as diethylaniline, pyridine, or quinoline. By partial esterification it is possible to first produce the ester compound acylated in 3-position, said ester having a free hydroxyl group in 21-position. Said 3-ester may subsequently be esterified in 21-position whereby, when using a different acylating agent than used for the acylation of the 3-hydroxyl group, a 3,20-diester of 3,14,-21-trihydroxy pregnanedione-(11,20) is obtained which has different acyl residues in 3- and 21-position.

Splitting off water from the hydroxyl group in 14-position and the neighboring 15-carbon atom is effected by subjecting the 3,21-diester to the action of an agent as it is commonly used in steroid chemistry for such purpose. Especially suitable agents are phosphorus oxychloride in pyridine, mineral acids, such as hydrochloric acid, salts of carboxylic acids, such as silver acetate and potassium acetate. For instance, heating the diester with hydrochloric acid, preferably in alcoholic solution causes splitting off water between carbon atoms 14 and 15 and formation of a double bond between said carbon atoms.

It is also possible to directly saponify the glyoxylic acid ester obtained on ozonization of 11-dehydrosarmentogenin by heating said ester with hydrochloric acid whereby not only the glyoxylic acid ester is saponified but the hydroxyl group in 14-position is split off at the same time.

It is of course not necessary to esterify the hydroxyl groups in 3- and 21-position before splitting off water between carbon atoms 14 and 15. The unesterified pregnane compound may directly be subjected to the dehydration reaction producing a double bond between carbon atoms 14 and 15. Such unesterified $\Delta^{14,15}$ unsaturated compounds may, if desired, subsequently be esterified either partly in 3-position or completely in 3- and 21-position or such esterification may be carried out after saturating the $\Delta^{14,15}$-double bond by hydrogenation.

Hydrogenation of the double bond between carbon atoms 14 and 15, is preferably carried out in the presence of a catalyst, such as platinum or palladium or a catalyst of the nickel or iron group.

The synthesis according to the present invention, opens a new way of preparing 11-keto pregnane derivatives which are of great importance in the preparation of compounds having the activity of the adrenocortical hormones. Some of such compounds possess therapeutic activity by themselves.

The attached drawings illustrate the various steps of the process of this invention.

Fig. 1 illustrates the process of converting glycosides of sarmentogenin into glycosides and hydroxyl derivatives of 11-dehydrosarmentogenin and 11-dehydrosarmentogenin itself.

Figure 2:
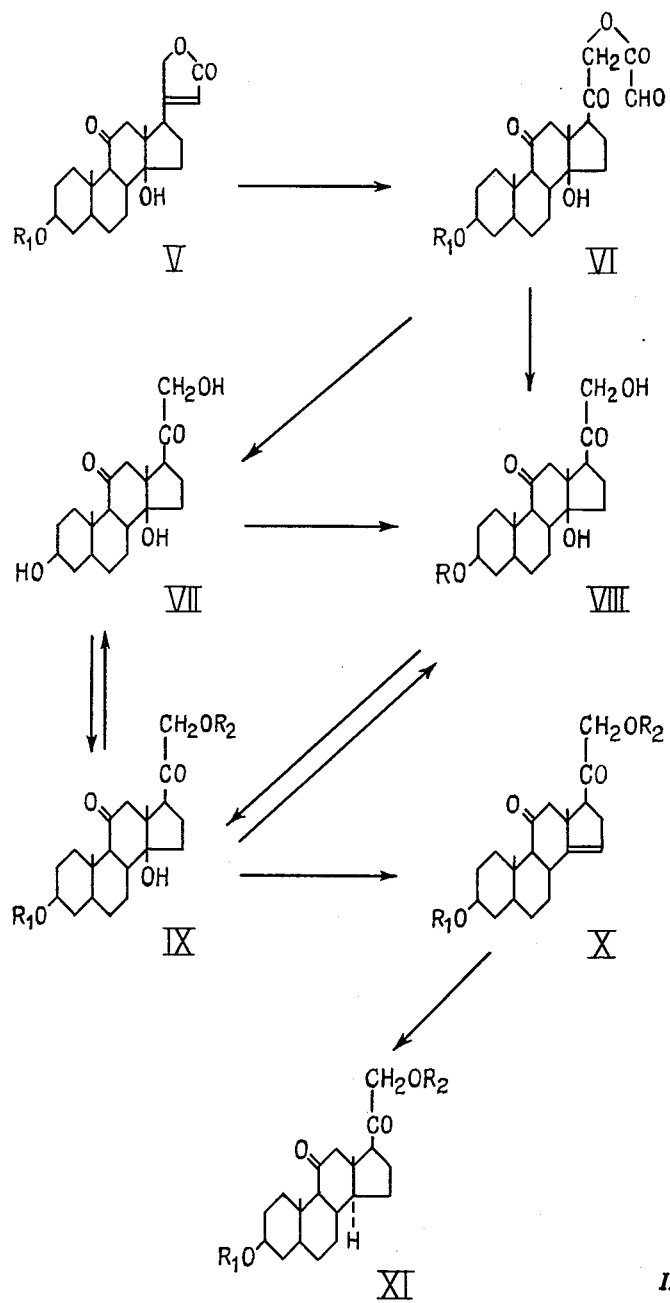

Fig. 2 illustrates the conversion of said 11-dehydrosarmentogenin and its 3-hydroxyl derivatives into 3,21-dihydroxy pregnanedione-(11,20) compounds which may serve as important intermediates for the production of adrenocortical hormones.

Compound I of said Fig. 1 represents sarmentocymarin which is converted by mild oxidation into 11-dehydrosarmentocymarin of Formula II. Mild hydrolysis of said Compound II yields 11-dehydrosarmentogenin of Formula III which in turn is converted into 11-dehydrosarmentogenin having in 3-position a group which on hydrolysis yields the hydroxyl group said compound corresponding to Formula IV. R in said formula represents a residue which on hydrolysis is split off and yields the hydroxyl group, such as an acyl residue.

Fig. 2 shows the opening of ring E in said 11-dehydrosarmentogenin and its 3-hydroxyl derivatives of Formula V. These compounds are converted by ring opening reaction into the corresponding glyoxylic acid esters of Formula VI which are saponified to 3,14,21-trihydroxy pregnanedione(11,20) of Formula VII or its 3-hydroxyl derivatives of Formula VIII. The 21-hydroxyl group of said compounds may also be converted into a group which on hydrolysis yields the hydroxyl group, for instance, said group may be esterified to yield 3,14-dihydroxy-21-acyloxy pregnanedione-(11,20) or its 3-derivatives of Formula IX. Said Compound IX is subjected to a dehydrating reaction splitting off water between carbon atoms 14 and 15 and yields 3,21-dihydroxy-$\Delta^{14,15}$-pregnanedione-(11,20) and its hydroxyl derivatives of Formula X which are finally hydrogenated to 3,21-dihydroxy pregnanedione-(11,20) and its esters of Formula XI.

In these formulas $R_1$ indicates hydrogen or a residue which on hydrolysis is split off to yield the hydroxyl group such as an acyl residue, while R and $R_2$ are residues which on hydrolysis are split off to yield the hydroxyl group, such as acyl residues.

The process according to the present invention corresponds in principle to the process disclosed in detail in my above mentioned copending patent application Serial No. 254,880, with the exception that the keto group in 11-position has been preformed before opening ring E of the sarmentogenin starting material.

The following examples serve to illustrate the present invention without however, limiting the same thereto.

EXAMPLE 1

*11-dehydrosarmentocymarin (Formula II)*

445 mg. of water-free sarmentocymarin (Formula I) are dissolved in 5 cc. of cold glacial acetic acid. Altogether 6 cc. of a 2% solution of chromium trioxide in glacial acetic acid (corresponding to 120 mg. of chromium trioxide) are added in several portions to said mixture. The last portions are not completely consumed by said oxidation reaction. Even after four hours there is still some chromium trioxide present in the reaction mixture. One drop of sodium bisulfite solution is added to the mixture which is then evaporated to dryness in a vacuum. The evaporation residue is thoroughly shaken with a mixture of chloroform and ether (1:3) and the resulting extract is successively washed with dilute hydrochloric acid, aqueous sodium carbonate solution and water. The washed extract is dried over sodium sulfate and the dried extract is evaporated to dryness. The resulting material reaction product (355 mg.) crystallizes and is further purified by dissolving the same in 10 cc. of ether and passing the solution through a chromatographic column containing 11 g. of chromatographic aluminium oxide. The column is then eluted with ether and mixtures of ether and methanol containing 1 to 4% of methanol. After evaporating the eluate to dryness, the evaporation residue is recrystallized from a mixture of acetone and ether or of methanol and ether. Crystallization sets in very slowly and the product is obtained in the form of long needles. More rapid crystallization takes place from aqueous methanol whereby 218 mg. in the form of woolly needles are obtained. The melting point of this product, after recrystallization is 130–137° C. $[\alpha]_D^{19}$: $-7.2 \pm 1°$ (c.: 1.9444 in acetone).

EXAMPLE 2

535 mg. of sarmentocymarin are used as starting material and are oxidized with altogether 5 cc. of a 2% chromium trioxide solution in glacial acetic acid (corresponding to 100 mg. of chromium trioxide). The oxidizing agent is added in several portions to the solution of sarmentocymarin in glacial acetic acid within about ten minutes. Practically all the chromium trioxide is consumed after about twenty minutes. A few drops of methanol are added to the reaction mixture which is allowed to stand for thirty minutes. On processing the reaction mixture as described in Example 1, 440 mg. of a crude product are obtained which, after recrystallization from aqueous methanol, yields 295 mg. of crystals melting at 130–137° C.

EXAMPLE 3

*11-dehydrosarmentogenin (Formula III)*

200 mg. of 11-dehydrosarmentocymarin of the melting point 130–137° C. are dissolved in 10 cc. of methanol. 10 cc. of N/10 sulfuric acid are added thereto and the mixture is heated to boiling under reflux for thirty minutes. Methanol is distilled off in a vacuum and the resulting evaporation residue crystallizes. It is filtered off by suction, washed with water and subsequently with a mixture of methanol and ether (1:3). 117 mg. of a crude product are obtained which melts at 240–250° C. Methanol is completely removed from the mother-liquors by heating in a vacuum at 50° C. for thirty minutes. The aqueous residue is cooled and extracted with a mixture of chloroform and ether (1:3) yielding, after evaporating the solvents, further 27 mg. of crude 11-dehydrosarmentogenin.

D-sarmentose having a melting point of 74–77° C. are recovered from the acid aqueous mother-liquor.

The crude 11-dehydrosarmentogenin is purified by dissolving the same in a mixture of dioxane and methanol (1:1). The solution is filtered and evaporated in a vacuum. The syrupy residue is dissolved in acetone. Pure 11-dehydrosarmentogenin crystallizes from said solution in colorless needles having a melting point of 252–253° C.; $[\alpha]_D^{19}$: $+10.6° \pm 3°$ (c.: 0.8943 in methanol). This compound is only slightly soluble in most solvents. On dehydrogenation is is converted into the known sarmentogenon.

EXAMPLE 4

*11-dehydrosarmentogenin acetate (Formula IV)*

100 mg. of 11-dehydrosarmentogenin are heated at 30° C. for 16 hours with 600 mg. of water-free pyridine and 400 mg. of acetic acid anhydride. On working up the reaction mixture according to the method described in Example 1 128 mg. of a crude product are obtained which does not crystallize. It is dissolved in a small amount of methanol. Some water is added to said solution and the methanol is then distilled off. The aqueous solution is of acid reaction. It is evaporated to dryness in a vacuum. 115 mg. are obtained, which are readily recrystallized from a mixture of acetone and ether. Coarse granules are obtained which become opaque at 160–170° C. and melt at 207–208° C. $[\alpha]_D^{20}$: $+18.2° \pm 1°$ (c.: 2.0024 in acetone). This compound does not react with semicarbazide acetate but yields only unreacted starting material. Consequently, the keto group must be present in 11-position and not in 3-position.

EXAMPLE 5

*Glyoxylic acid ester (Formula VI)*

1 g. of crystalline 11-dehydrosarmentogenin acetate, melting at 207–208° C. is dissolved in 50 cc. of ethyl acetate and is cooled to about $-80°$ C. About 400 cc. of dry oxygen containing about 4.5% of ozone are introduced and passed through said solution within about 25 minutes. The blue-violet solution is allowed to stand at about $-80°$ C. for 20 minutes whereby the color should not entirely disappear. Thereafter, the ozonized solution is evaporated to dryness in a vacuum at 20° C. The residue is dissolved in 5 cc. of glacial acetic acid. 1 g. of zinc dust is gradually added in small portions while shaking vigorously until a strip of potassium iodine-starch paper remains colorless. The reaction mixture is filtered and the filtrate is evaporated to dryness. The residue is dissolved in a mixture of chloroform and ether (1:3), and is washed successively with water, aqueous sodium carbonate solution, and again with water, dried over anhydrous sodium sulfate, and evaporated to dryness. 925 mg. of the glyoxylic acid ester according to Formula VI are obtained. This ester is of neutral reaction.

EXAMPLE 6

*3β-acetoxy-14β,21-dihydroxy pregnanedione-(11,20) (Formula VIII)*

925 mg. of the glyoxylic acid ester of Formula VI are dissolved in 70 cc. of methanol. A solution of 700 mg. of potassium bicarbonate in 20 cc. of water is added thereto and the reaction mixture is allowed to stand at 20° C. for 16 hours. Methanol is removed by distillation in a vacuum and the resulting residue is repeatedly extracted with chloroform. The combined dried chloroform extract is evaporated to dryness in a vacuum. 685 mg. of 3β-acetoxy - 14β,21 - dihydroxy pregnanedione - (11,20) of Formula VIII are obtained.

EXAMPLE 7

*3β,14β,21-trihydroxy pregnanedione-(11,20)*
*(Formula VII)*

120 mg. of potassium hydroxide dissolved in 2.2 cc. of methanol are added to 150 mg. of the glyoxylic acid ester of Formula VI. The mixture is allowed to stand at 23° C. for 16 hours. Thereafter a small amount of water is added and residual free alkali is neutralized by addition of potassium bicarbonate. Methanol is distilled off in a vacuum. The residue is several times extracted with chloroform. The combined chloroform extracts are washed with a small amount of water, dried over sodium sulfate, and evaporated to dryness. 122 mg. of 3β,14β,21-trihydroxy pregnanedione-(11,20) of Formula VII are obtained.

EXAMPLE 8

*3β,21-diacetoxy-14β-hydroxy pregnanedione-(11,20)*
*(Formula IX)*

685 mg. of 3β-acetoxy-14-β,21-dihydroxy pregnanedione-(11,20) of Formula VIII are acetylated according to the method described in Example 4 with 2 cc. of water-free pyridine and 1.5 cc. of acetic acid anhydride. 740 mg. of a crude acetylation product are obtained which, after recrystallization from a mixture of acetone and petroleum ether yield 413 mg. of crystals which melt at 198–201° C. Further 72 mg. of the same compound melting at 195–201° C. are obtained from the mother-liquor by chromatographic purification. After recrystallization colorless granules are obtained which melt at 201–203° C.; $[\alpha]_D^{18}: +75.7° \pm 1.5°$ (c.: 1,491 in chloroform).

Elementary analysis gave the following results:

3.995 mg. of said compound $C_{25}H_{36}O_7$ (molecular weight 448.54) yield 9.815 mg. of $CO_2$ and 2.891 mg. of $H_2O$.

Calculated _____ 66.94% C, 8.09% H
Found _____ 67.05% C, 8.10% H

EXAMPLE 9

*Complete saponification of 3β,21-diacetoxy-14-β-hydroxy pregnanedione-(11,20) of Formula IX.*

200 mg. of 3β,21-diacetoxy-14-β-hydroxy pregnanedione-(11,20) are dissolved in 6.5 cc. of methanol. A solution of 500 mg. of potassium hydroxide in 0.5 cc. of water is added thereto and the mixture is allowed to stand at 20° C. for 16 hours. When proceeding according to the method described above in Example 7 for the complete saponification of the glyoxylic acid ester of Formula VI, 155 mg. of 3β,14β,21-trihydroxy pregnanedione-(11,20) of Formula VII are obtained. Acylation of said compound according to e. g. the method described in Example 4 by means of various acylating agents readily yields diesters of Formula IX.

EXAMPLE 10

*Partial saponification of 3β,21-diacetoxy-14β-hydroxy pregnanedione-(11,20) of Formula IX*

220 mg. of said starting material having a melting point of 195–201° C. are dissolved in 20 cc. of methanol and mixed with a solution of 200 mg. of potassium bicarbonate in 5 cc. of water. The mixture is allowed to stand at 20° C. for 16 hours. By working up the reaction mixture according to the method described above in Example 7 195 mg. of 3β-acetoxy-14β,21-dihydroxy pregnanedione-(11,20) of Formula VIII are obtained. 26 mg. of the starting material crystallizes from a mixture of ether and petroleum ether.

EXAMPLE 11

*3β,21-diacetoxy pregnanedione-(11,20) (Formula XI)*

63 mg. of crystalline-3β,21-diacetoxy-14β-hydroxy pregnanedione-(11,20) of Formula IX, having a melting point of 198–205° C. are dissolved in 1.5 cc. of pyridine. 0.01 cc. of water and 0.2 cc. of phosphorous oxychloride are added thereto and the mixture is heated in a closed vessel at 70° C. for 16 hours. Thereafter ice is added to the reaction mixture which is then extracted with ether. The extract is washed with water, aqueous sodium carbonate solution and again with water. Filtration over a small amount of aluminium oxide yields 40 mg. of crude 3β,21-diacetoxy-$\Delta^{14,15}$-pregnane-dione-(11,20) of Formula X.

40 mg. of said unsaturated compound are hydrogenated by means of hydrogen in the presence of 10 mg. of a platinum oxide catalyst $PtO_2H_2O$ in 4 cc. of glacial acetic acid for 1 hour during which period of time 15 cc. of hydrogen are absorbed. The reaction mixture is filtered and washed with chloroform and ether. The filtrate is evaporated to dryness and yields 39 mg. of a crude compound which are mixed with 1.5 cc. of a 2% chromium trioxide solution in glacial acetic acid. The reaction mixture is allowed to stand for 16 hours and is then evaporated to dryness in a vacuum. The residue is taken up in a mixture of chloroform and ether (1:3). The resulting extract is washed first with dilute hydrochloric acid and then with an aqueous sodium carbonate solution. The washed extract is dried over sodium sulfate and yields on evaporation to dryness a crude product from which after recrystallization from a mixture of ether and petroleum ether, 19 mg. of crystals having a melting point of 160–168° C. are obtained. Recrystallization of said crude product yields crystals melting at 167–170° C. and representing 3β,21-diacetoxy pregnanedione-(11,20) of Formula XI.

Hydrolysis of the ester group in 3-position, oxidation of the resulting hydroxyl group in 3-position to a keto group and introduction of a double bond between carbon atoms 4 and 5 yield 11-dehydrocorticosterone and its esters.

Introduction of a hydroxyl group in 17-position, oxidation of the 3-hydroxyl group, and introduction of a double bond between carbon atoms 4 and 5 yield 17-hydroxy-11-dehydrocorticosterone (cortisone).

I claim:

1. In a process of producing pregnane compounds, the steps comprising dissolving sarmentocymarin in glacial acetic acid, gradually adding thereto portion by portion a solution of chromium trioxide in glacial acetic acid in an amount sufficient to oxidize the 11-hydroxyl group of said sarmentocymarin, thereby keeping the oxidation mixture at a low temperature, boiling under reflux the resulting 11-dehydrosarmentocymarin in an aqueous alcoholic solution of a mineral acid until the cymaroside group is split off, esterifying the resulting 11-dehydrosarmentogenin by means of acetic acid anhydride with the addition of water-free pyridine, dissolving the resulting 11-dehydrosarmentogenin acetate in ethyl acetate, cooling said solution to about −80° C., introducing into said cooled solution ozonized oxygen thereby keeping the reaction mixture at a temperature between about −80° C. and about −20° C. until the lactone ring E of said 11-dehydrosarmentogenin acetate is split open to form the corresponding 21-glyoxylic acid ester of 3,14,21-trihydroxy pregnanedione-(11,20), dissolving said glyoxylic acid ester in methanol, adding an aqueous-alkali bicarbonate solution to said methanolic solution, keeping the resulting mixture at room temperature until the glyoxylic acid ester is saponified thereby forming a ketol side chain in 17-position, esterifying the resulting 3-acetoxy-14,21-dihydroxy pregnanedione-(11,20) by means of acetic acid anhydride with the addition of water-free pyridine, dissolving the resulting 3,21-diacetoxy-14-hydroxy pregnanedione-(11,20) in pyridine, adding phosphorus oxychloride to said solution at a temperature of about 70° C. until water is split off and a double bond is formed between carbon atoms 14 and 15, hydrogenating the resulting 3,21 - diacetoxy - $\Delta^{14,15}$ - pregnenedione-(11,20) in glacial acetic acid by means of catalytically activated hydrogen in the presence of a platinum hydrogenation catalyst, and isolating the resulting 3,21-diacetoxy pregnanedione-(11,20).

2. In a process of producing pregnane compounds, the steps comprising oxidizing, by means of ozone, 11-dehydrosarmentogenin to split open the double bond in ring E thereof, saponifying the resulting glyoxylic acid ester by means of an ester-saponifying agent, thereby forming a ketol side chain in 17-position, splitting off water, by means of a dehydrating agent, thereby forming a double bond between carbon atoms 14 and 15, and isolating the resulting $\Delta^{14,15}$-pregnene compound.

3. In a process of producing pregnane compounds, the steps comprising oxidizing, by means of ozone, 11-dehydrosarmentogenin to split open the double bond in ring E thereof, saponifying the resulting glyoxylic acid ester by means of aqueous alcoholic alkali bicarbonate solution, thereby forming a ketol side chain in 17-position, splitting off water, by means of a dehydrating agent, thereby forming a double bond between carbon atoms 14 and 15, and isolating the resulting $\Delta^{14,15}$-pregnene compound.

4. In a process of producing pregnane compounds, the steps comprising oxidizing an 11-dehydrosarmentogenin ester, by means of ozone, to split open the double bond in ring E of said ester, saponifying the resulting glyoxylic acid ester by means of alcoholic alkali hydroxide solution thereby producing a ketol side chain in 17-position and a free hydroxyl group in 3-position, esterifying the free hydroxyl group in 3- and 21-position, splitting off water, by means of a dehydrating agent, thereby forming a double bond between carbon atoms 14 and 15, and isolating the resulting $\Delta^{14,15}$-pregnene compound.

5. In a process of producing pregnane compounds, the steps comprising oxidizing, by means of ozone, a compound of the formula

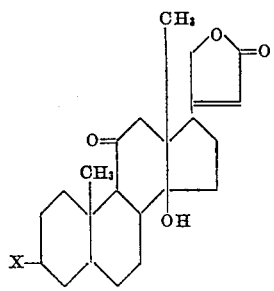

wherein X is a substituent selected from the group consisting of the hydroxyl group, the lower alkanoyloxy group, and a glycosido group naturally occurring in sarmentogenine glycosides, saponifying the resulting ozonization product to form the —CO—CH$_2$OH side chain at carbon atom 17, converting said —CO—CH$_2$OH side chain into the side chain —CO—CH$_2$.Y wherein Y is the lower alkanoyloxy group, splitting off water between the hydroxyl group in 14-position and a hydrogen atom in 15-position by means of a dehydrating agent, and hydrogenating the resulting double bond between the carbon atoms in 14- and 15-position by means of an olefinic double bond-hydrogenating agent.

6. In a process of producing pregnane compounds, the steps comprising oxidizing, by means of ozone, a compound of the formula

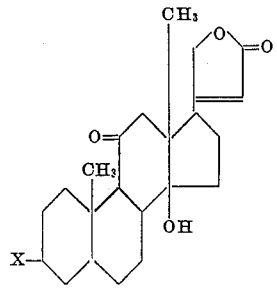

wherein X is a substituent selected from the group consisting of the hydroxyl group, the lower alkanoyloxy group, and a glycosido group naturally occurring in sarmentogenine glycosides, saponifying the resulting ozonization product to form the —CO—CH$_2$OH side chain at carbon atom 17, splitting off water between the hydroxyl group in 14-position and a hydrogen atom in 15-position by means of a dehydrating agent, and hydrogenating the resulting double bond between the carbon atoms in 14- and 15-position by means of an olefinic double bond-hydrogenating agent.

7. The 3,14,21-trihydroxy pregnanedione-(11,20) compound of the formula

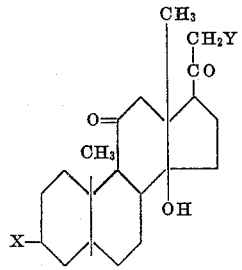

wherein X and Y are substituents selected from the group consisting of the hydroxyl group and the lower alkanoyloxy group.

8. 3$\beta$,14$\beta$,21-trihydroxy pregnanedione-(11,20).

9. 3$\beta$-acetoxy-14$\beta$,21-dihydroxy pregnanedione-(11,20).

10. 3$\beta$,21 - diacetoxy - 14$\beta$ - hydroxy pregnanedione-(11,20).

References Cited in the file of this patent

FOREIGN PATENTS 653,480    Great Britain _____ May 16, 1951

OTHER REFERENCES

Fieser et al.: Natural Products Related to Phenanthrene, 3rd ed., pp. 550–51 (1949).